(12) United States Patent
Love

(10) Patent No.: US 9,000,922 B1
(45) Date of Patent: Apr. 7, 2015

(54) HONESTY TEST SYSTEM

(71) Applicant: Willie R. Love, Atlanta, GA (US)

(72) Inventor: Willie R. Love, Atlanta, GA (US)

(*) Notice: Subject to any disclaimer, the term of this patent is extended or adjusted under 35 U.S.C. 154(b) by 58 days.

(21) Appl. No.: 13/972,234

(22) Filed: Aug. 21, 2013

(51) Int. Cl.
*G08B 13/14* (2006.01)
*G06K 19/067* (2006.01)

(52) U.S. Cl.
CPC .............. *G08B 13/14* (2013.01); *G06K 19/067* (2013.01)

(58) Field of Classification Search
CPC .................................................. G06K 19/067
USPC ......... 340/568.7, 571; 116/2; 109/38; 283/83
See application file for complete search history.

(56) References Cited

U.S. PATENT DOCUMENTS

| | | | | |
|---|---|---|---|---|
| 3,036,298 | A | * | 5/1962 | Schiller ..................... 340/568.7 |
| 3,424,122 | A | * | 1/1969 | De Angelis ..................... 116/2 |
| 3,930,249 | A | | 12/1975 | Steck et al. |
| 5,059,949 | A | * | 10/1991 | Caparoni et al. .............. 340/571 |
| D401,176 | S | | 11/1998 | Coupel |
| 6,472,986 | B1 | | 10/2002 | Sorriaux |
| 6,870,483 | B1 | | 3/2005 | Davis |
| 7,724,137 | B2 | | 5/2010 | Page |
| 7,982,604 | B2 | | 7/2011 | Nichols et al. |
| 8,217,791 | B2 | | 7/2012 | Grimm |
| 2002/0070874 | A1 | | 6/2002 | Williams et al. |
| 2006/0238347 | A1 | | 10/2006 | Parkinson et al. |
| 2011/0109457 | A1 | | 5/2011 | Maharshak et al. |

* cited by examiner

*Primary Examiner* — John A Twell, Jr.

(57) ABSTRACT

An honesty test system for immediately identifying a thief. The system features a decoy such as a book or magazine that presents a piece of money. Disposed inside the decoy is circuitry. As the money is removed from the decoy, the circuitry loop is completed, which activates a transmitter. The transmitter sends a signal to a receiver in a nearby alarm box, causing an alarm to sound.

7 Claims, 4 Drawing Sheets

(ISO Open View)

(Detail View)

(Detail View)

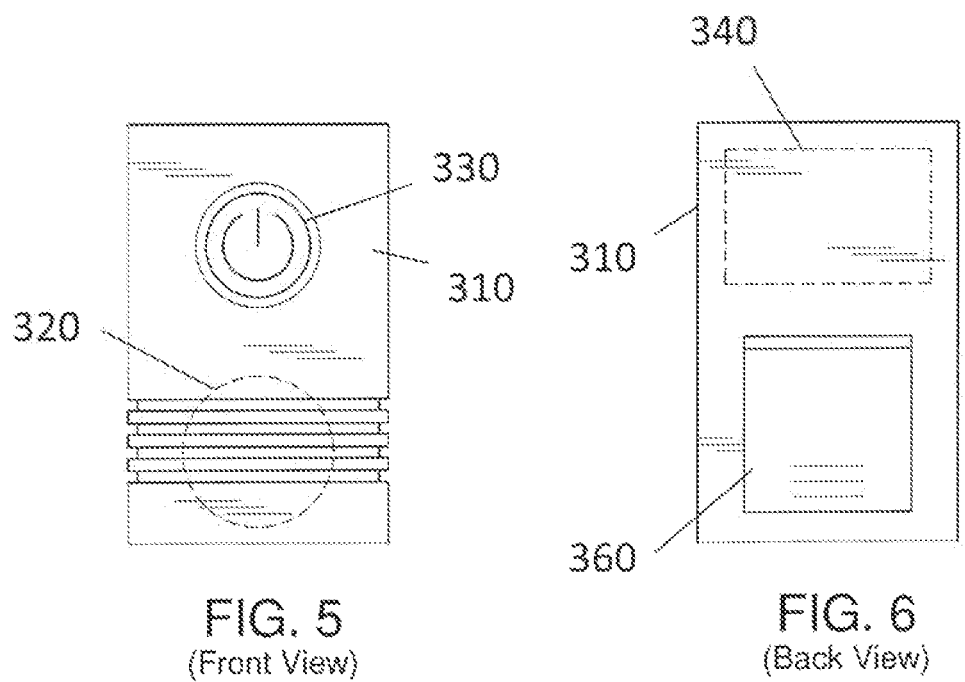

HONESTY TEST SYSTEM

BACKGROUND OF THE INVENTION

Many individuals have had the unfortunate experience of having money stolen from them. The present invention features an honesty test system. The system is designed to immediately identify a thief by presenting a piece of money that when removed sounds an alarm. The system of the present invention can be made to resemble various items such as a book, a phone book, a magazine, or any other appropriate item.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

An honesty test system (100) for detecting a thief. In some embodiments, the honesty test system (100) comprises (a) a decoy (110) adapted to temporarily hold and present a money bill (210), the decoy (110) has an inner surface (210), the decoy (110) can move between an open position and a closed position respectively showing and hiding its inner surface (120), wherein a first conductor (130a) and a second conductor (130b) are disposed on the inner surface (120) or the decoy (110), the first conductor (130a) and second conductor (130b) are spaced a distance apart, an insulator tape (220) is disposed atop both the first conductor (130a) and the second conductor (130b), wherein a transmitter (150) is disposed in the decoy (110), a first wire (140a) operatively connects the first conductor (130a) to the transmitter (150) and a second wire (140b) operatively connects the second conductor (130b) to the transmitter (150); (b) an alarm box (310), wherein a receiver (340), an alarm (350), and a speaker (320) are each disposed in the alarm box (310), the receiver (340) is operatively connected to the alarm (350), the alarm is operatively connected to the speaker (320), the receiver (340) is in communication with the transmitter (150) in the decoy (110); and (c) a money bill (210) having a first surface (211) and a second surface (212) opposite the first surface (211), wherein a third conductor (130c) is disposed on the second surface (212) of the money bill (210), the first surface (211) of the money bill (210) faces away from the inner surface (120) of the decoy (110), and the second surface (212) of the money bill (210) faces the inner surface (120) of the decoy (110), wherein when the third conductor (130c) is placed completely atop the insulator tape (220) and the decoy (110) is in the dosed position at least a portion of the money bill (210) is visible from outside the decoy (110), when the money bill (210) is slid such that the third conductor (130c) slides off of the insulator tape (220) the third conductor (130c) contacts both the first conductor (130a) and the second conductor (130b) thereby bridging an electrical circuit between the first conductor (130a) and the second conductor (130b) that causes a first contact signal to be sent to the transmitter (150), when the first contact signal is received by the transmitter (150), the transmitter (150) sends a first transmitter signal to the receiver (340) in the alarm box (310), when the receiver (340) receives the first transmitter signal, the receiver (340) sends a first receiver signal to the alarm (350), which causes an alarm sound to be emitted from the speaker (320), thereby alerting an individual that a thief has stolen the money bill (210).

In some embodiments, the decoy (110) comprises a book, a magazine, a phone book, or a photo album. In some embodiments, the first conductor (130a) comprises aluminum tape. In some embodiments, the second conductor (130b) comprises aluminum tape. In some embodiments, the third conductor (130c) comprises aluminum tape. In some embodiments, the first conductor (130a), second conductor (130b), and third conductor (130c) each comprise aluminum tape. In some embodiments the insulator tape (220) comprises clear tape, black tape, or dark tape.

BRIEF DESCRIPTION OF THE DRAWINGS

FIG. 5 shows a front view of the system of alarm box of the present invention.

FIG. 6 shows a back view of the alarm box of the system of the present invention.

DESCRIPTION OF PREFERRED EMBODIMENTS

Following is a list of elements corresponding to a particular element referred to herein:
  100 honesty test system
  110 decoy (e.g., book, magazine, etc.)
  120 inner surface of decoy
  130a first conductor
  130b second conductor
  130c third conductor
  140a first wire
  140b second wire
  150 transmitter
  160 power source (e.g., battery)
  210 money bill
  211 first surface of money bill
  212 second surface of money bill
  220 insulation tape
  310 alarm box
  320 speaker
  330 power button
  340 receiver
  350 alarm
  360 battery compartment
  362 power source Referring now to FIG. 1-7, the present invention features an honesty test system (100). The system (100) is designed to immediately identify a thief by presenting a money bill (210) that when removed sounds an alarm. The system (100) of the present invention can be made to resemble various items such as a book, a phone book, a magazine, or any other appropriate item.

Figure 1:
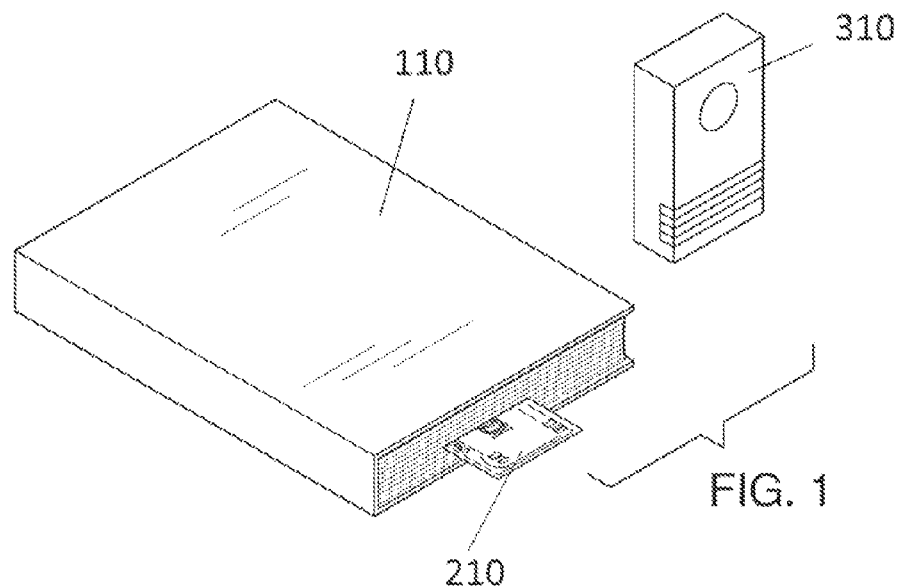
FIG. 1 shows a perspective view of the system of the present invention (the decoy (book) is closed).
Figure 2:
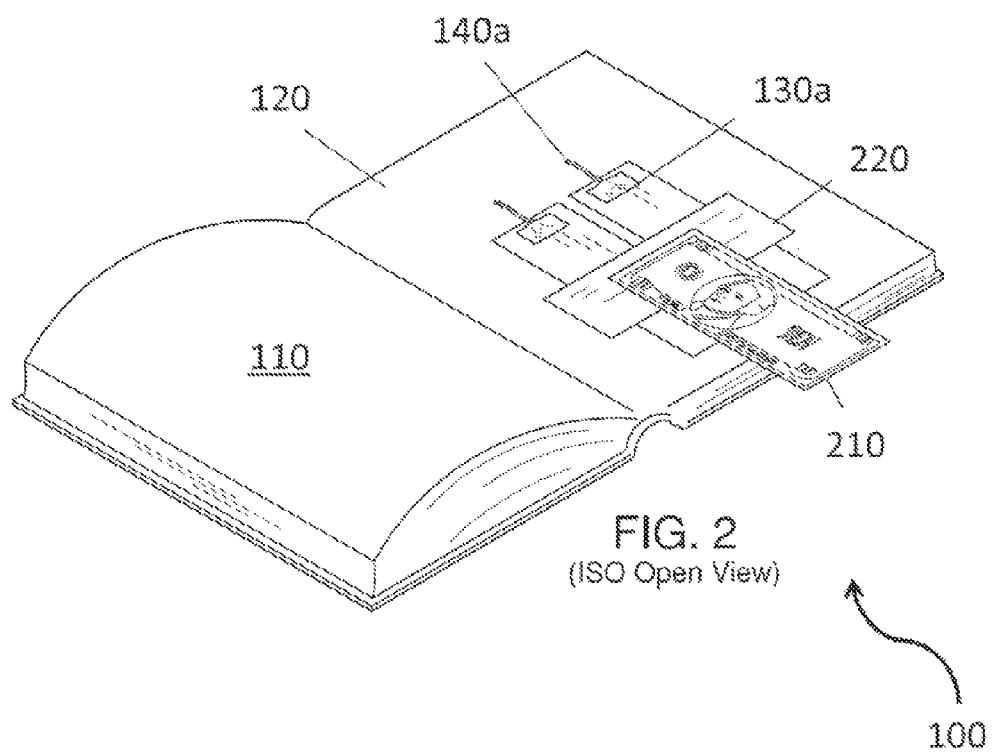
FIG. 2 shows a perspective view of the system of the present invention (the decoy (book) is open).

The system (100) comprises a decoy (110). As shown in FIG. 1, the decoy (110) holds the money bill (210) and presents the money bill (210). The decoy (110) may be any appropriate item including but not limited to a book, a magazine, a phone book, a photo album, etc.

The money bill (210) is removably mounted to an inner surface (120) of the decoy (110). The decoy (110) can move between an open position (shown in FIG. 2) and a closed position (shown in FIG. 1) respectively showing and hiding its inner surface (120).

A first conductor (130a) and a second conductor (130b) are disposed on the inner surface (120) of the decoy (110). In some embodiments, the first conductor (130a) comprises an aluminum tape conductor. In some embodiments, the second conductor (130b) comprises an aluminum tape conductor. Such conductors are well known to one of ordinary skill in the art. The conductors (130) are not limited to aluminum tape conductors and may comprise any appropriate conductor.

The first conductor (130a) and second conductor (130b) are positioned a distance apart. In some embodiments, as shown in FIG. 3, the first conductor (130a) and second conductor (130b) are positioned parallel to one another.

The system (100) further comprises a transmitter (150) disposed in the decoy (110). A first wire (140a) operatively connects the first conductor (130a) to the transmitter (150). A second wire (140b) operatively connects the second conductor (130b) to the transmitter (150). The transmitter (150) is operatively connected to a power source (160), e.g., a battery. The transmitter (150) is in communication with a receiver (340) disposed in an alarm box (310).

Figure 3:
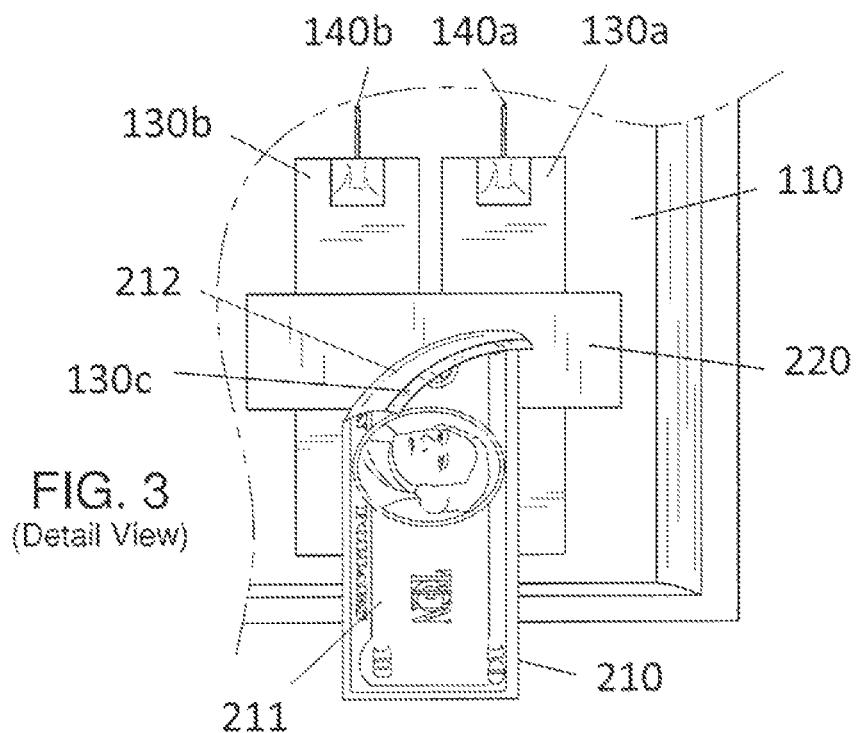
FIG. 3 shows a detailed view of the system of the present invention.
Figure 4:
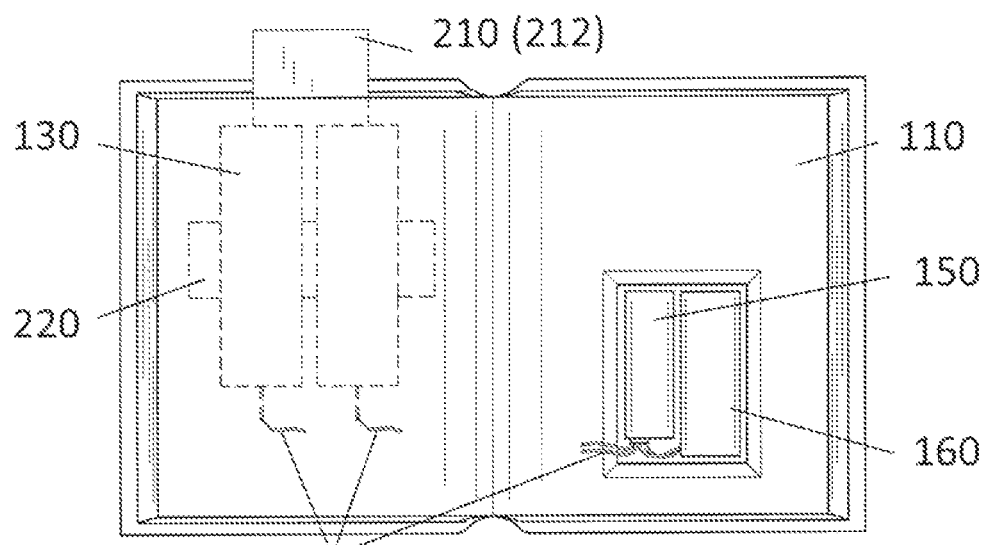
FIG. 4 shows a detailed view of the system of the present invention.
Figure 7:
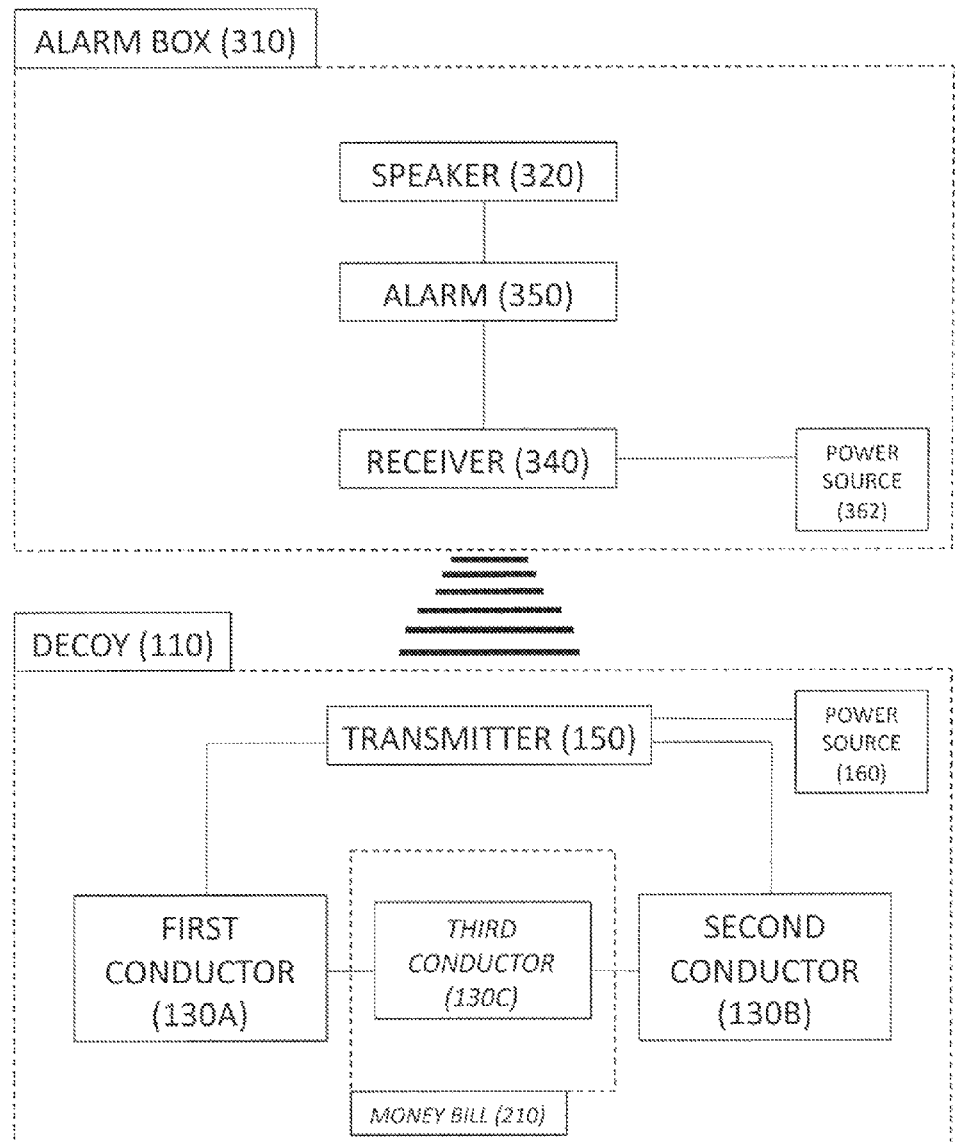
FIG. 7 shows a schematic representation of the electrical components of the system of the present invention.

As shown in FIG. 3, an insulator tape (220) is disposed atop both the first conductor (130a) and the second conductor (130b). In some embodiments, the insulator tape (220) is a clear tape. In some embodiments, the insulator tape (220) is a black or dark tape.

The system (100) further comprises a money bill (210) having a first surface (211) (e.g., a top surface) and a second surface (212) (e.g., a bottom surface, a contact surface). The first surface (211) of the money bill (210) faces away from the inner surface (120) of the decoy (110), and the second surface (212) of the money bill (210) faces the inner surface (120) of the decoy (110).

A third conductor (130c) is disposed on the second surface (212) of the money bill (210). The third conductor (130c) is configured to contact both the first conductor (130a) and the second conductor (130b) when it the money bill (210) is slid out of the decoy (110). For example, the money bill (210) is placed in the decoy (110) such that the third conductor (130c) is atop the insulator tape (220) and does not contact the first conductor (130a) and the second conductor (130b). When the money bill (210) is removed, it slides off of the insulator tape (220) and contacts both the first conductor (130a) and the second conductor (130b), bridging the electrical circuit between the first conductor (130a) and the second conductor (130b).

When the electrical circuit is bridged, a first contact signal is sent to the transmitter (150). When the first contact signal is received by the transmitter (150), the transmitter (150) sends a first transmitter signal to the receiver (340) in the alarm box (310). When the receiver (340) receives the first transmitter signal, the receiver (340) sends a first receiver signal to the alarm (350), which causes an alarm sound to be emitted from the speaker (320).

As shown in FIG. 5 and FIG. 6, the alarm box (310) houses the receiver (340). The receiver (340) is operatively connected to the speaker (320). In some embodiments, the receiver (340) is operatively connected to a power source (362), e.g., a battery. The power source (362) may be housed in a battery compartment (360) in the alarm box (310). In some embodiments, the receiver (340) and/or the power source (362) is operatively connected to a power button (330). Power buttons are well known to one of ordinary skill in the art.

In some embodiments, the system (100) further comprises a microprocessor operatively connected to the receiver (340). When the receiver receives the first transmitter signal, the receiver (340) sends a first input signal to the microprocessor whereupon the microprocessor sends a first output command to the alarm (350) to cause the alarm (350) to emit an alarm sound via the speaker (320).

As used herein, the term "about" refers to plus or minus 10% of the referenced number.

The disclosures of the following U.S. Patents are incorporated in their entirety by reference herein: U.S. Pat. No. 6,472,986; U.S. Pat. No. 7,982,604; U.S. Pat. No. 7,724,137; U.S. Pat. No. 8,217,791; U.S. Pat. No. 6,870,483; U.S. Pat. Application No. 2006/0238347; U.S. Pat. Application No. 2002/0070874; U.S. Design Pat. No. 401,176; U.S. Pat. No. 3,930,249; U.S. Pat. Application No. 2011/0109457.

Various modifications of the invention, in addition to those described herein will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way.

The reference numbers recited in the below claims are solely for ease of examination of this patent application, and are exemplary, and are not intended in any way to limit the scope of the claims to the particular features having the corresponding reference numbers in the drawings.

What is claimed is:

1. An honesty test system (100) for detecting a thief, said honesty test system (100) comprising:
(a) a decoy (110) adapted to temporarily hold and present a money bill (210), the decoy (110) has an inner surface (210), the decoy (110) can move between an open position and a closed position respectively showing and hiding its inner surface (120), wherein a first conductor (130a) and a second conductor (130b) are disposed on the inner surface (120) of the decoy (110), the first conductor (130a) and second conductor (130b) are spaced a distance apart, an insulator tape (220) is disposed atop both the first conductor (130a) and the second conductor (130b), wherein a transmitter (150) is disposed in the decoy (110), a first wire (140a) operatively connects the first conductor (130a) to the transmitter (150) and a second wire (140b) operatively connects the second conductor (130b) to the transmitter (150);
(b) an alarm box (310), wherein a receiver (340), an alarm (350), and a speaker (320) are each disposed in the alarm box (310), the receiver (340) is operatively connected to the alarm (350), the alarm is operatively connected to the speaker (320), the receiver (340) is in communication with the transmitter (150) in the decoy (110); and
(c) a money bill (210) having a first surface (211) and a second surface (212) opposite the first surface (211), wherein a third conductor (130c) is disposed on the second surface (212) of the money bill (210), the first surface (211) of the money bill (210) faces away from the inner surface (120) of the decoy (110), and the second surface (212) of the money bill (210) faces the inner surface (120) of the decoy (110), wherein when the third conductor (130*c*) is placed completely atop the insulator tape (220) and the decoy (110) is in the closed position at least a portion of the money bill (210) is visible from outside the decoy (110), when the money bill (210) is slid such that the third conductor (130*c*) slides off of the insulator tape (220) the third conductor (130*c*) contacts both the first conductor (130*a*) and the second conductor (130*b*) thereby bridging an electrical circuit between the first conductor (130*a*) and the second conductor (130*b*) that causes a first contact signal to be sent to the transmitter (150), when the first contact signal is received by the transmitter (150), the transmitter (150) sends a first transmitter signal to the receiver (340) in the alarm box (310), when the receiver (340) receives the first transmitter signal, the receiver (340) sends a first receiver sign to the alarm (350), which causes an alarm sound to be emitted from the speaker (320) thereby alerting an individual that a thief has stolen the money bill (210).

2. The system (100) of claim 1, wherein the decoy (110) comprises a book, a magazine, a phone book, or a photo album.

3. The system (100) of claim 1, wherein the first conductor (130*a*) comprises aluminum tape.

4. The system (100) of claim 1, wherein the second conductor (130*b*) comprises aluminum tape.

5. The system (100) of claim 1, wherein the third conductor (130*c*) comprises aluminum tape.

6. The system (100) of claim 1, wherein the first conductor (130*a*), second conductor (130*b*), and third conductor (130*c*) each comprise aluminum tape.

7. The system (100) of claim 1, wherein the insulator tape (220) comprises clear tape, black tape, or dark tape.

* * * * *